US006988098B2

(12) United States Patent
Sonkin et al.

(10) Patent No.: US 6,988,098 B2
(45) Date of Patent: Jan. 17, 2006

(54) GRID DATA PROCESSING SYSTEMS AND METHODS

(75) Inventors: Dmitry Sonkin, Redmond, WA (US); Andrew Nechayev, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 10/422,398

(22) Filed: Apr. 24, 2003

(65) Prior Publication Data

US 2004/0215603 A1 Oct. 28, 2004

(51) Int. Cl.
  *G06F 17/30* (2006.01)
(52) U.S. Cl. .................. 707/3; 707/2; 707/4; 707/5
(58) Field of Classification Search ............. 707/2, 707/3, 4, 5, 10
  See application file for complete search history.

(56) References Cited

U.S. PATENT DOCUMENTS

| 6,453,356 | B1 * | 9/2002 | Sheard et al. ............ 709/231 |
| 2001/0047406 | A1 * | 11/2001 | Araujo et al. ............ 709/223 |
| 2002/0032725 | A1 * | 3/2002 | Araujo et al. ............ 709/203 |
| 2002/0077909 | A1 * | 6/2002 | Kanojia et al. ............ 705/14 |
| 2002/0087580 | A1 * | 7/2002 | LaCroix et al. ......... 707/104.1 |
| 2002/0142427 | A1 * | 10/2002 | Merkulov et al. ......... 435/194 |
| 2003/0074256 | A1 * | 4/2003 | LaCroix ................ 705/14 |
| 2003/0120593 | A1 * | 6/2003 | Bansal et al. ............ 705/39 |
| 2003/0182463 | A1 * | 9/2003 | Valk .................... 709/310 |
| 2004/0015516 | A1 * | 1/2004 | Harter et al. ........... 707/104.1 |
| 2004/0230572 | A1 * | 11/2004 | Omoigui ................. 707/3 |

OTHER PUBLICATIONS

Accelrys, "Accord grid control," www.accelrys.com, 2001-2003, 3 pages.
Easy Grid ActiveX, "Easy grid control," share2.com, 2001, 2 pages.
Grieger, S., et al., "A Grid Control for Toolbook—Part I," *AVDF Toolbook Article*, avdf.com, Nov. 1996, 7 pages.
Hsu, K., et al., "A numerical technique for two-dimensional grid generation with grid control at all of the boundaries," *Journal of computational Physics*, protal.acm.org, 2003, 2 pages.
Masiello, R.D., "It's put up or shut up for grid controls," *IEEE Press, Portal to Computing Literature*, 2003, 1 page.
Mayer, K., "Working with the grid control in dB2K/dBASE plus," *dBASE, Inc.*, dbase.com, Nov. 2002 (last modified), 11 pages.
Morris, R.D., "DHTML sortable grid control (with form elements)," eggheadcafe.com, Feb. 10, 2003, 12 pages.
Smith, A., "Redistribution of totals through hierarchical data," *APL Berlin 2000 Proceedings*, 2000, 212-218.
Xceed Grid, "Grid for .NET," xceedsoft.com, Feb. 10, 2003, 2 pages.

* cited by examiner

*Primary Examiner*—Frantz Coby
(74) *Attorney, Agent, or Firm*—Woodcock Washburn LLP

(57) ABSTRACT

A system for generating database query results includes a database suitable for access by a software query, a data storage component which serializes and stores information queried from the database, a storage view component which accesses the data storage component to perform sequential de-serialization of column data, a sort view component which maintains a pointer to the storage view component enabling subsequent physical row access to the data storage component, a grid storage component which acquires the de-serialized query results and provides application-specific formatting, and a grid control component which supplies output data to the a display. The sort view component provides column and row level sorting upon request. The formatted results are viewable simultaneous with the streaming of data from the database and simultaneous with a sorting of the query results.

43 Claims, 4 Drawing Sheets

GRID DATA PROCESSING SYSTEMS AND METHODS

FIELD OF THE INVENTION

The invention relates generally to the field of data handling and display in software applications, and more particularly to a grid-style format for data handling in a process.

BACKGROUND OF THE INVENTION

Grids are software constructs that act as part of a user process. Typically, grids are used as part of a graphical user interface (GUI) that enables the viewing of items like spreadsheets and databases. In the realm of databases, grids are useful because they give a user the ability to display large amounts of data on a display screen. The user may then add, delete, or modify the data in the grid. Generally, grids resemble tables that have unique column names and multiple rows, the intersection of which are termed cells which contain data related to the column and row. Often, several tables or several databases can be searched to extract specific query information. The result of such a query is very often a table itself with distinct columns and rows representing the results of the search. Grids may be used to display those results and organize the data for easy consumption by the user.

Specific program standards may be used to insert, modify, delete, search, and retrieve data from databases. One such program standard is known as the Structured Query Language (SQL). An example of a product implementing the standard is Microsoft® SQL-Server™. Typically, a SQL query (request for data) may return query results (the data returned as a result of the request for data) which can vary in size. Theoretically, the query results could approach the size of the originating database or may be only a single instance of row data with the appropriate attributes or columns of the search criteria. One problem with such queries is that a user has difficulty in making boundary assumptions on the maximum amount of memory needed to store data for display. As a consequence, systems today maintain all of the returned search data on computer disk in a temporary storage file. This requires fast de-serialization of objects for subsequent display in a grid when the user changes his view or the window size changes.

Waiting for all data of a query search to be read and formatted often results in a delay for the user display. Additionally, each time the user moves within the display grid, another long delay is possible while formatted data is accessed in full for a display change. It would be advantageous if the temporary storage file size need not be estimated and if a faster method of updating the user display were provided. Also, since application-specific formatting may be desired, it is desirable to allow the display of grid data to be easily customized to suit the application utilizing a grid.

Additionally, the formatted data in display on the grid may not be organized for optimal utility by the user. A user may wish to sort the columns of the displayed data. This sorting action may result in further delays as the data usually must be fully consumed by the application and processed into the new organization before the display is updated for the user. Depending on the size of the effort, the speed of the processor, and the efficiency of the application, significant user delays may occur.

The above mentioned limitations and the corresponding desires for overcoming those limitations demonstrate the need and utility for the current invention.

SUMMARY OF THE INVENTION

The present invention is directed to systems and methods that quickly assemble data in a table format. Typically, data to be assembled in a table format (grid) may be the result of a search of one or more source data tables or databases. The data resulting from a search can be voluminous and time consuming for a computer system to process, store and access for display. In addition, a user may also wish to sort the grid data in a more convenient manner. A sort process on grid data may be time consuming if an entire data set requires full sorting before being displayed. The present invention provides methods and architecture wherein the user may enjoy a grid display of the search result data set as soon as a portion of the data is available. The user may view and use the displayed data even as new result data is being extracted from the data source. In addition, the user may sort the displayed result data even as new result data is being extracted from a data source. The architecture of an exemplary embodiment desirably includes multiple modules which partition the duties of results data collection and assembly such that separate and independent threads are generated for results data retrieval, storage, display, and sorting. This technique allows display and user manipulation of search result data to occur simultaneous with data input collection. Features of the invention may be made a portion of or be wholly consumed by a developer application process and therefore have utility as an adjunct to applications requiring the fast manipulation of search result data in a grid format.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
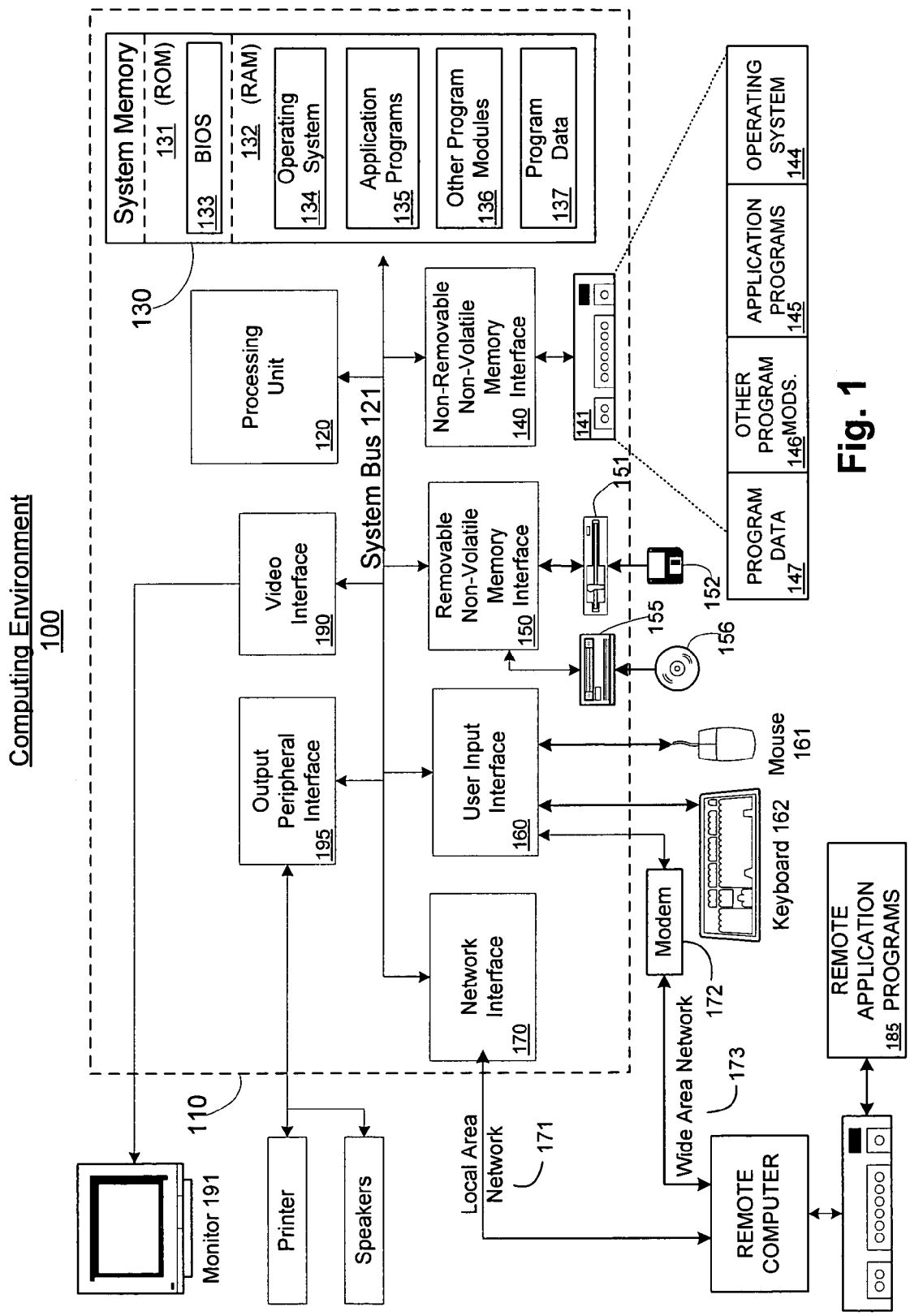
FIG. 1 is a block diagram showing an exemplary computing environment in which aspects of the invention may be implemented.

A grid control is a user interface component displaying data as cells. Each cell is an intersection of one row (horizontal dimension) and one column (vertical dimension). When the number of rows to be displayed exceeds some maximum number of rows that can fit into the view window of a monitor screen, a vertical scroll bar may be implemented that allows the user to scroll the view window up and down. In this manner, the monitor displays the rows that were previously hidden from the user's view. A similar scroll bar may be implemented for hidden or off-display columns of data cells.

A data source for the grid data is desirably some relational data base maintenance system (RDBMS), such as, for example, Microsoft® SQL Server™. A user may wish to run an application which utilizes some of the data held within the RDBMS. In a typical grid usage scenario, only some of the data from the database is relevant to the purposes of the user. Therefore, an application user may execute a certain query against the data source. For example, assume a user desires to view the data in a grid format inside the application at the client computer. Data is to be retrieved from the data source and buffered somewhere for subsequent display in accordance with a view window display area. A user can request the displayed data to be sorted in a special way through some interaction with an application consuming the grid. When this happens, desirably all of the rows are rearranged in a specific order but the query itself is not re-executed. That is, preferably all operations are performed locally using the buffered data itself without going back to the original data source.

The data stored in a temporary data storage location often uses application specific interpretation before the data is driven to the display. For example, a single bit of data can be interpreted as checkbox within an application, numeric data can optionally be converted to a specific format according to a user-defined code page or application settings or NULL data values can be displayed as empty cells for an application. Application developers consuming the grid control and grid data storage components may easily customize application-based interpretation of data to suit their specific needs or delegate to a default implementation.

A grid control component preferably starts displaying the first few rows of query data results immediately while the remaining data is still being consumed from the original data source. As more and more data gets consumed from the data source, a vertical scroll bar may reflect the new number of rows and automatically reposition itself according to the new scrolling range.

Returned query data can be sorted and resorted while still being consumed from the original data source. Sorting desirably does not affect the contents of the original temporary storage. The grid control component is preferably automatically kept in sync with a new sorting order and the number of sorted rows. Application developers consuming the grid control and data storage components should be able to control the comparison operations performed during a sorting to change the sorting order as they desire. Optionally they can delegate this operation to a default implementation.

It is contemplated that the components described herein with respect to the current invention may be implemented as C# classes and may be packaged as a class library.

Exemplary Computing Device

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 1 10. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET's languages and services, and in other distributed computing frameworks as well.

Exemplary Embodiments

Figure 2:
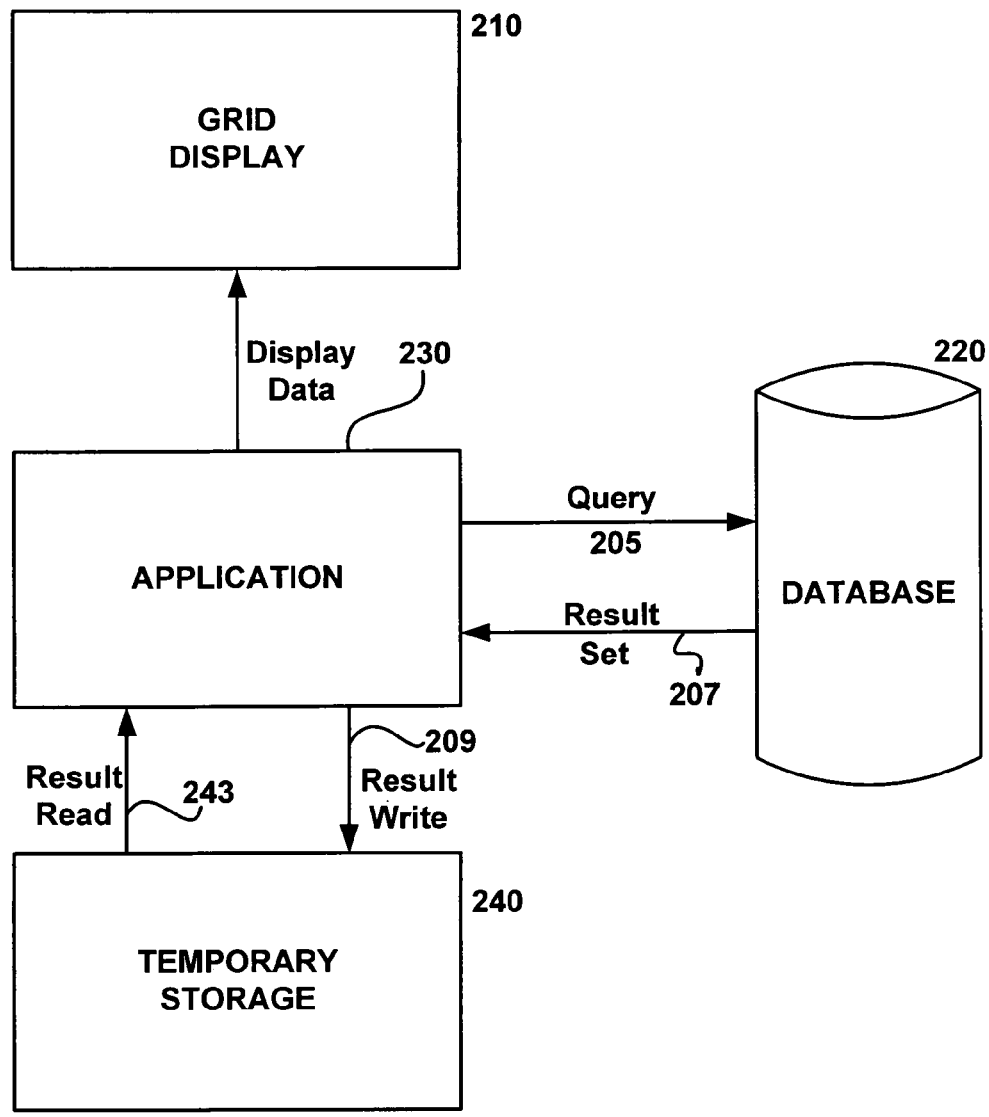
FIG. 2 is a block diagram showing an exemplary environment in which aspects of the invention may be implemented.

FIG. 2 depicts an exemplary system 200 utilizing a grid display 210 as the component which displays selected results retrieved from a database 220 via an application 230. Data, such as business data, for example, may be organized in a relational database 220. Normally, only a subset of the data is of interest. Consequently, an application, such as a Structured Query Language (SQL) based application, may query 205 the database 220, to extract a subset of the data, referred to as a result set 207. The application may allow the result set 207 to be written 209 into a temporary storage component 240. The application then may recall the result data 243 and process the data as needed.

If the data is to be displayed by the application, a grid display 210 may be utilized. A user of the display may, depending on the application and software user interface of the grid display, be able to add, delete and modify the displayed results.

Figure 3:
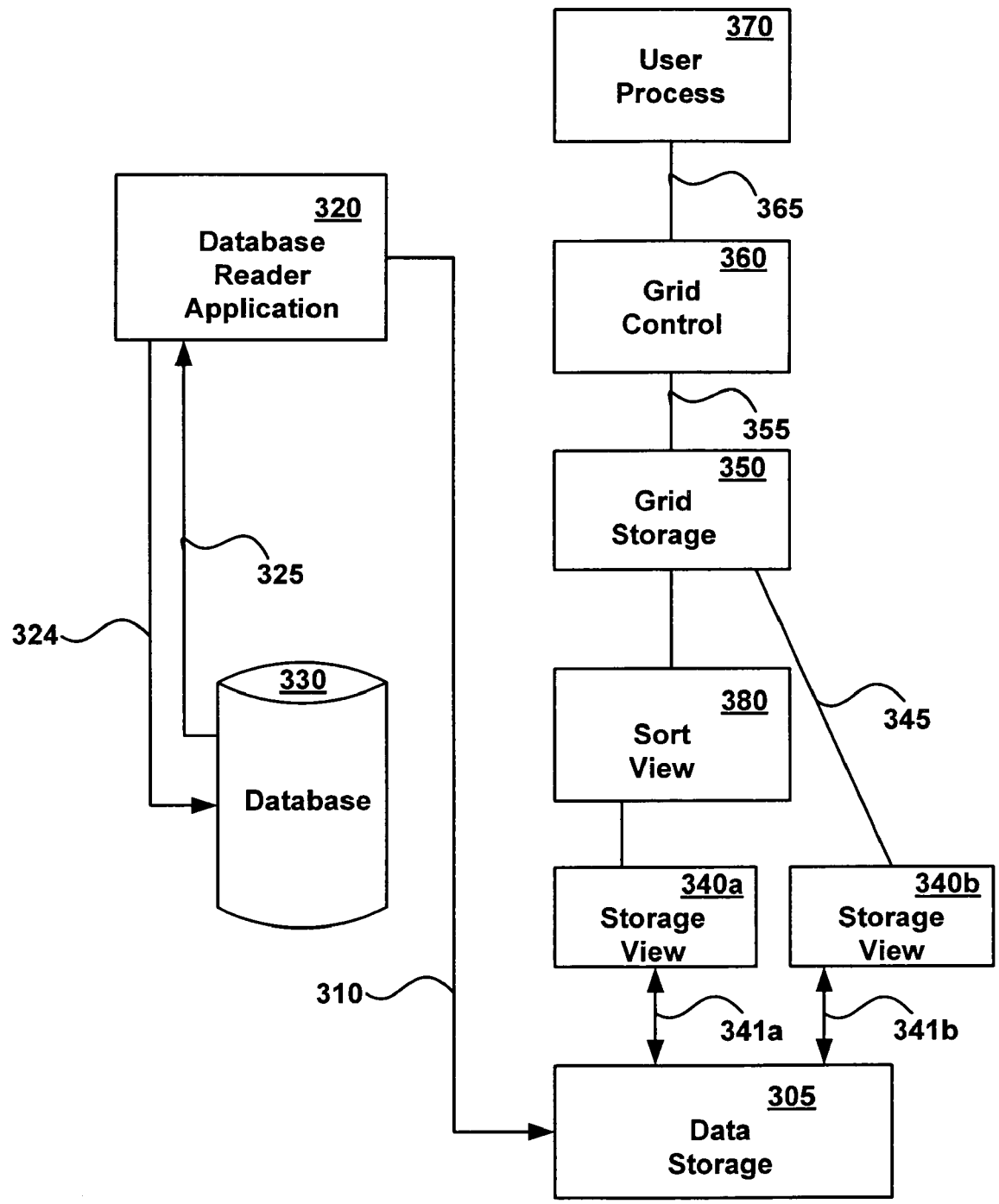
FIG. 3 shows a block diagram of an exemplary embodiment that is useful in describing the present invention.

FIG. 3 depicts an exemplary component block diagram of the present invention. FIG. 3 provides a more detailed configuration of the system shown in FIG. 2. The system depicted in FIG. 3 provides greater functionality to an application in the processing of grid data including the display of grid data.

Conceptually, the embodiment shown in FIG. 3 may be viewed as having a three-tier architecture where the database 330 and reader application 320, the data storage component 305 and the storage view components 340a,b comprise a data access layer, the grid storage 350 and sort view 380 components comprise a business logic layer and, the grid control component 360 and a user process 370 comprise a user interface layer. Overall, an external application may be superimposed upon at least the user interface layer and possibly other components.

Referring to FIG. 3, the data storage component 305 is responsible for serializing data from any data base management system (DBMS) or data provider (such as .NET) by consuming the provider's implementation of a data reader application 320 and the respective interface 310. Examples of typical providers are an Ole™ database data reader and a SQL data reader. A query made to a data reader 320 desirably extracts information from a database 330 using a data request (the query) 324 and a data response (the query results) 325. In the process of initializing the data storage 305 component, a data reader interface 310 passes query results data into the data storage 305 temporary storage registers. During this call, the data storage component 305 obtains the name and type information about each column exposed by the data reader action. Name information is primarily used to properly set column data headers in a grid. Type information controls subsequent serialization and de-serialization of per row data. Serialization occurs on a separate thread started by software method call within the data storage component 305. With each row of data written onto temporary storage, the data storage component 305 keeps track of specific row offsets in a special in-memory array. These offsets will be used for fast subsequent retrieval of data from the temporary storage within the data storage component 305. Progress of reading data is reported by the data storage component 305 via a special software module event. Preferably, any consumer object, such as an application which utilizes the current invention, interested in monitoring such progress may sign up for this event and monitor the progress of data reading.

In the case of an unexpected process termination, e.g., due to a user closing a grid window, the data storage component 305 allows for cancellation of the storage operation via a method call. The data storage component 305 is able to serialize any standard data type directly exposed by reading data from the data source. If the column data type is unknown, the data storage component 305 desirably treats it as a string. Preferably, any derived software module, application or class that wants to support a specialized serialization for certain data types can override the internal method call and substitute an alternate method call.

The data storage component 305 desirably serves as the data store for query results as well as live trace data. There may be several implementations of the data storage component 305. One exemplary implementation persists result data in memory. Another exemplary implementation stores result data on disk. Memory based storage is typically used for client filled data especially when edit capability is desired of the grid control component 360. Disk based storage may be filled from a data reader 320 and typically contains read only data; although data in the storage file can be modified if necessary. If the data is to be modified and if the size of the new cell data is the same or less than the existing cell data, the cell data gets overwritten in place. If the new data is larger, a new row is added at the end of storage file and a row pointer is updated to point to a new location. Thus cell modification functionality may be achieved. The data storage component is complemented by the storage view component 340.

The storage view component 340a,b accesses the data storage component 305 and has a pointer to the data storage object itself. Desirably, the only way for clients to retrieve data from the data storage component 305 is through an instance of a storage view component or object 340a,b and the interfaces between the components 341a,b. Any number of storage view objects 340a,b can be created for concurrent data access. As an example, two instances of storage view components or objects 340a,b are depicted. Each storage view object 340a,b internally is reading portions of the temporary storage within the data storage component 305 that the data storage component 305 reported as complete. Any storage view component also creates and supports multiple storage view objects 340 providing read/write access to the stored data to multiple users accessing the temporary data store in a free threaded fashion. The in-memory row offsets array within the data storage component 305 allows for fast random per row access to the temporary storage within the data storage 305. Once the underlying file pointer is positioned at the beginning of the row, column type metadata from the temporary storage is used for proper sequential de-serialization of column objects from the temporary storage. A software method of the storage view component 340a,b serves to acquire cell data (cell acquisition). It performs de-serialization of the persisted object back from the temporary storage within the data storage component 305.

The grid storage component 350 provides a so-called "glue" or translation layer between the grid control component 360 and access 345 to the data storage component 305 itself via the storage view 340a,b. The main software method of the grid storage component 350 serves to acquire cell data as part of a string (string acquisition). When invoked by the grid control component 360, the string acquisition method delegates actual data fetching 345 to the previously described cell acquisition method of the storage view component 340a,b. The string acquisition module then provides the application specific formatting of the data. It is noteworthy to observe that specific formatting may be used for a user-desired process such as a specific application demanding formatted data. An example of such a user-desired process may be a display of the formatted data 355 on a user display via a grid control 360 and link 365.

Another function of the grid storage component 350 is to subscribe and monitor storage events to periodically update the grid control 360 when a certain number of new rows is retrieved from the data source of the database 330. If a consuming external application supports sorting of the formatted grid data 355, the grid storage component 350 is desirably responsible for initializing and working with another component called sort view 380.

The sort view component 380 maintains a pointer to its own storage view component 340a or object for access to the underlying data storage 305. One purpose of the sort view component 380 is to provide a sorted view of the formatted grid data 355 to the client. Sorting gets started on a separate thread by using a software method. In the case of an unexpected process termination, e.g., due to a user closing a grid window, the data storage component 305 allows for cancellation of the sorting operation via a method call. The sort view component 380 uses an insertion sort in order to maintain a sorted array of absolute row numbers. A binary search algorithm is preferably used in order to find an appropriate position of the new row in the array of grid data to be processed by the user. When two rows are compared to each other as part of binary search, a default set of comparison rules apply. An external application developer consuming the sort view component 380 can override a software virtual method in order to change sorting order.

When the grid storage component 350 receives a request for a particular cell data from the grid control 360, it uses the sort view component 380 object for sorting. The grid control component 360 references the sort view object 380 in order to retrieve an absolute row number to fetch the appropriate data from the data storage component 305. Then this absolute row number is used to fetch the actual data from the data storage component 305. The grid storage component 350 desirably provides scrolling ability to support the user interface as well as the proper data conversion routines from the native type to string for the grid. The grid storage component 350 has a sufficient number of virtual protected methods to serve as a base class for other specialized grid views.

This sort view component 380 interaction with the user application and other components gives a user an illusion that the underlying data itself has been sorted when in actuality, what is sorted is this array of absolute row numbers itself. The sort view component 380, while performing a sort on data, also exposes an event flag representing a storage notify event. Thus any consumer or user of the component may subscribe to be notified every time a new row is added to the storage and when the last row is added. This event allows the grid control component 360 to get updated automatically again by the grid storage component 350 when a certain number of new rows had been sorted.

The grid control component 360 itself is desirably a user process interface component. It preferably carries no logic concerning underlying the grid data or its format. As previously discussed, application specific formatting of grid data is performed by the grid storage component 350. The grid control's user process interface thread is preferably never blocked by the underlying storage components because serialization and sorting of data are desirably performed on separate worker threads. This design allows for the grid control component 360 itself to be fast and responsive to the user process. For example, if the user process 370 is a display process where the grid data is to be displayed to the user, the grid data component may be fast and responsive to user inputs by scrolling and displaying of the grid data while the sorting and serialization module threads are operating in parallel.

The grid control 360 component is capable of using both a vertical and a horizontal scroll bar to display more information than the current window size allows. The grid control component will be able to show unlimited number of rows by using a scaling algorithm for communication with the vertical scroll bar. For the first N rows it will be 1—1 map to the current scrolling position. When the number of rows exceeds N, the grid control 360 will map the first and the last M % of rows 1—1 to the scrolling position, and everything between them will be mapped according to the scaling algorithm. The algorithm may be used only when user drags the scroll bar and decides which rows should be used depending on the current scroll bar position and the current number of rows. An internal buffer may be used for reads/writes and synchronizes to the disk automatically when requests are made that exceed the current view window.

In order to accommodate many rows of data, the grid control interfaces with grid storage component 350 that will be queried only for data that is needed to be displayed. Since storage for application formatted data is in grid storage component 350, the grid control 360 itself will be tasked only with data displaying and editing, and not with storing the formatted data as is the grid storage component 350.

The grid control 360 queries the grid storage 350 as to whether a particular cell inside a text column is editable or not when a user selects such a cell (e.g. by clicking on the cell) or uses a keyboard to navigate into the cell. If a user is allowed to edit data for that particular cell, then the grid storage component 350 interface will be queried by the grid control 360 for possible values that can be presented to the user (to fill a combo box, for example). The grid storage component 350 will also be asked by the grid control 360 to validate the current value of the cell when editing is finished and to store the value if it is correct.

The grid control component 360 desirably will display data for drawing the grid. The displayed data will be queried from left to right, from top to bottom. Thus, for each visible row, desirably all visible columns in a row will be drawn before moving on to the next visible row. The rationale is that this technique helps to optimize the storage on file system so hat it can read a complete row when the data is requested.

A single grid storage component 350 may have multiple views of the same physical data. Thus, operationally, multiple users can access data from multiple threads without interference. Sometimes, it is desired to sort grid storage 350 data as well. The sort view object 380 provides for sorting of the data on a separate thread. The grid storage component 350 supports desired interactions between the data store and the grid control.

The components described above may have multiple implementations and therefore may derive from clearly defined interfaces to support polymorphism as is known by those of skill in the art. A disk data storage component may be implemented to asynchronously store data given any data reader interface. The components may be written in any appropriate software language. An exemplary embodiment is written in C#. The C# modules correlate to each other according to diagram of FIG. 3 as described hereinabove.

Figure 4:
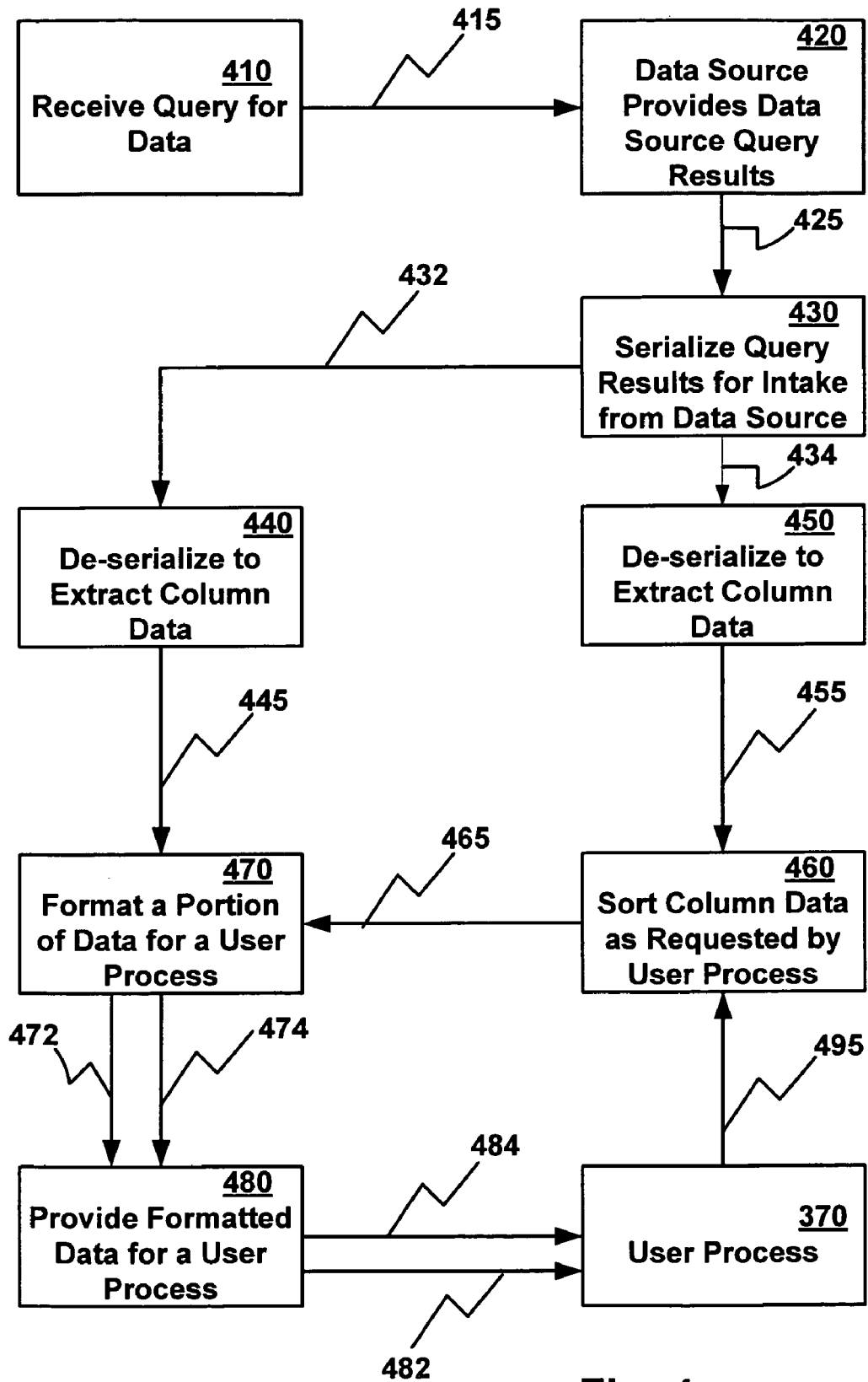
FIG. 4 shows a flow diagram for an exemplary embodiment of the present invention.

FIG. 4 is a illustrates an exemplary flow diagram for the present invention. Initially, a query is received 410 for data residing in a data source, such as a database. The data source responds 415 to the query, such as an SQL query, and provides the selected data 420 as query results 425. Step 430 then serializes the query results as it consumes the results 425 from the data source. At this point, at least one instance of de-serialization 440, 450 of the query results 432, 434 occurs and the de-serialized data is provided to a formatting step 470 where application specific formatting is applied.

It should be noted that multiple de-serialization paths (440, 450) may be established from the serialization step 430. Additionally, a sort column step 460 step may also be established corresponding to the de-serialize step 450. FIG. 4 depicts an exemplary two instances 440, 450 of the de-serialization step wherein one of those instances 450 has a sort column step 460 associated with it whereas the other de-serialization step 440 does not. The two de-serialization steps 440, 450 may be considered separate and independent steps whose results 445, 465 are independent inputs to the formatting step 470. Formatting of the de-serialized data at step 470 therefore produces independently formatted outputs 472 and 474 corresponding to the independent inputs 445 and 465. Step 480 acts as a staging point for access to the formatted data such that a user process 370 may intake the two separate formatted data streams 482 and 484.

Assuming the user process 370 is at least a display process, the user may wish to sort de-serialized data 455 as it is being displayed. To accommodate this function a sort column step 460 may be invoked by a user 495 to alter organization of the column data 465 prior to formatting. The user may therefore affect the display by changing the organization of column data within the grid display.

It is to be appreciated that FIG. 4 includes multiple threads of operation which operate independently from one another. For example, assuming that the user process is at least a display process, the display of formatted data by a user process 370 is independent of the intake and serialization 430 of data from a data source. Also, the sorting action 460 is independent of any serialization 430. These functions are, of course independent of the number of parallel de-serialization (i.e. 440, 450) steps invokes by a user process. In addition, the user process itself may be composed of multiple independent processes. For example, the user process may be a network connection wherein multiple users may gain access to the formatted data available from step 480 and thus multiple individual user processes (i.e. 482, 482) may be invoked and utilized using the current invention.

It may be understood that, given an exemplary embodiment, certain method steps of FIG. 4 relate to components of FIG. 3. For example, step 420 may relate to database 330, serializing step 430 may relate to data storage component 305, de-serializing step 440 may relate to storage view component 340b, steps 450 and 460 may relate to storage view component 340a and sort view component 380 respectively, formatting step 470 may relate to grid storage component 350, and step 480 may relate to grid control 360.

As mentioned above, while exemplary embodiments of the present invention have been described in connection with various computing devices and network architectures, the underlying concepts may be applied to any computing device or system in which it is desirable to implement a data organization process which may include a display of the organized data. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for generating query results from a data source, the method comprising:
   receiving a query for information to be gathered from the data source;
   executing the query wherein information queried from the data source is generated;
   serializing the information queried from the data source to form data source query results;
   de-serializing the data source query results to sequentially extract column data to form de-serialized query results;
   formatting a portion of the de-serialized query results to generate formatted results; and
   providing the formatted results to a subsequent process;
   wherein only a portion of the de-serialized query results is formatted for immediate use by the subsequent process.

2. The method of claim 1, wherein the serializing step comprises obtaining name and type information of each column of information gathered from the data source.

3. The method of claim 2, wherein the serializing step further comprises tracking specific row offsets, using a memory array, while writing the data source query results into a data storage component.

4. The method of claim 3, wherein the specific row offsets enable random row access of the data source query results.

5. The method of claim 1, wherein the de-serializing step further comprises establishing a pointer, positioning the pointer at the beginning of a row, using row offsets, and reading column type metadata to accomplish sequential de-serialization of column information.

6. The method of claim 1, wherein the subsequent process comprises a display process.

7. The method of claim 6, wherein the display process comprises providing at least one scaled scroll bar to reflect the size of the received but not displayed information which is simultaneously being serialized from the data source.

8. The method of claim 6, wherein the display process further comprises displaying a formatted version of a first portion of the information queried from the data source simultaneous with serialization of a second portion of the information queried from the data source.

9. The method of claim 1, further comprising sorting the formatted results simultaneously with the serialization of the information queried from the data source.

10. The method of claim 1, wherein the subsequent process is a display process and wherein the display and sorting of formatted results are performed simultaneous with serialization of the information queried from the data source.

11. The method of claim 1, wherein a plurality of instances of de-serialization step are performed independently to provide concurrent multiple access to the data source query results.

12. The method of claim 11, wherein at least one list of pointers to physical row locations of the formatted results per instance of de-serialization step is provided to sort the formatted results.

13. A computer-readable medium containing instructions, which, when executed on a computer, perform a method for generating query results from a data source, the method comprising:
   receiving a query for information to be gathered from the data source;
   executing the query wherein information queried from the data source is generated;
   serializing the information queried from the data source to form data source query results;
   de-serializing the data source query results to sequentially extract column data to form de-serialized query results;
   formatting a portion of the de-serialized query results to generate formatted results; and
   providing the formatted results to a subsequent process;
   wherein only a portion of the de-serialized query results is formatted for immediate use by the subsequent process.

14. The computer-readable medium of claim 13, wherein the serializing step comprises instructions for obtaining name and type information of each column of information gathered from the data source.

15. The computer-readable medium of claim 13, wherein the serializing step further comprises instructions for tracking specific row offsets, using a memory array, while writing the data source query results into a data storage component.

16. The computer-readable medium of claim 15, wherein the specific row offsets enable random row access of the data source query results.

17. The computer-readable medium of claim 13, wherein the de-serializing step further comprises instructions for establishing a pointer, positioning the pointer at the beginning of a row, using the row offsets, and reading column type metadata to accomplish sequential de-serialization of column information.

18. The computer-readable medium of claim 13, wherein the subsequent process comprises a display process which further comprises instructions for displaying the formatted results simultaneously with the serialization of the information queried from the data source.

19. The computer-readable medium of claim 13, further comprising instructions for sorting the formatted results simultaneously with the serialization of the information queried from the data source.

20. The computer-readable medium of claim 13, wherein the subsequent process is a display process and wherein the displaying and sorting of formatted results are simultaneous with serialization of the information queried from the data source.

21. The computer-readable medium of claim 20, wherein the display process comprises providing at least one scaled scroll bar to reflect the size of the received but not displayed information which is simultaneously being serialized from the data source.

22. The computer-readable medium of claim 13, wherein a plurality of instances of the de-serialization step are performed independently to provide multiple access to the data source query results.

23. The computer-readable medium of claim 22, wherein at least one list of pointers to physical rows of the formatted results per instance of de-serialization step is provided to sort the formatted results.

24. A system for generating database query results, the system comprising:
   a data storage component which serializes and stores information queried from a database to form the database query results;

a storage view component which accesses and the data storage component to perform sequential de-serialization of column data to form de-serialized query results;

a grid storage component which acquires the de-serialized query results and provides application-specific formatting to generate formatted results; and a sort view component which maintains a pointer to the storage view component enabling subsequent physical row access to the data storage component;

wherein the sort view component provides column and row level sorting responsive to a request.

25. The system of claim 24, wherein the data storage component further comprises an in-memory array tracking specific row offsets while writing the database query results into the data storage component.

26. The system of claim 25, wherein the specific row offsets enable retrieval of the database query results.

27. The system of claim 24, wherein a sort of the formatted results is simultaneous with the serialization of the information queried from the database.

28. The system of claim 24, further comprising a grid control component to display the formatted results.

29. The system of claim 28, wherein the grid control component displays only a portion of the formatted results which are viewable on a single screen of a monitor.

30. The system of claim 28, wherein a first portion of the database query results are formatted and displayed simultaneous with serialization of a second portion of the database query results.

31. The system of claim 28, wherein a sort of the formatted results, a display of the formatted results and a serialization of the information queried from the originating database are simultaneous.

32. The system of claim 24, further comprising a plurality of storage view components to provide concurrent data access for a plurality of users.

33. The system of claim 32, further comprising at least one sort view component per storage view component to support sorting functions.

34. A computer system for generating database query results, the computer system comprising:

a processor suitable as a hardware engine for software execution;

an input device and output device for access to the computer system;

a database suitable for access by a software query;

a data storage component which serializes and stores information queried from the database to form database query results;

a storage view component which accesses the data storage component to perform sequential de-serialization of column data to form de-serialized query results;

a sort view component which maintains a pointer to the storage view component enabling subsequent physical row access to the data storage component;

a grid storage component which acquires the de-serialized query results and provides application-specific formatting to generate formatted results; and a grid control component which supplies output data to the output device;

wherein the sort view component provides column and row level sorting responsive to a request and the output device outputs the formatted results.

35. The system of claim 34, wherein the data storage component further comprises an in-memory array tracking specific row offsets while writing the database query results into the data storage component.

36. The system of claim 35, wherein the specific row offsets enable retrieval of the database query results.

37. The system of claim 34, wherein a sort of the formatted results is simultaneous with the serialization of the information queried from the database.

38. The system of claim 34, wherein the output device is a display and where the grid control component displays only a portion of the formatted results which are viewable on a single screen of the display.

39. The system of claim 38, wherein the display depicts at least one scaled scroll bar to reflect the size of the serialized but not displayed information which is simultaneously being received from the database.

40. The system of claim 38, wherein a first portion of the database query results are formatted and displayed simultaneous with serialization of a second portion of the database query results.

41. The system of claim 38, wherein a sort of the formatted results, a display of the formatted results and a serialization of the information queried from the database are simultaneous.

42. The system of claim 34, further comprising a plurality of storage view components to provide concurrent data access for a plurality of users.

43. The system of claim 34, further comprising at least one sort view component per storage view component to support sorting functions.

* * * * *

UNITED STATES PATENT AND TRADEMARK OFFICE
CERTIFICATE OF CORRECTION

PATENT NO. : 6,988,098 B2  Page 1 of 1
APPLICATION NO. : 10/422398
DATED : January 17, 2006
INVENTOR(S) : Dmitry Sonkin et al.

It is certified that error appears in the above-identified patent and that said Letters Patent is hereby corrected as shown below:

On the title page, item (57), in "Abstract", in column 2, line 12, after "the" delete "a".

In column 4, line 54, delete "1 10." and insert -- 110. --, therefor.

In column 11, line 13, after "FIG. 4" delete "is a".

Signed and Sealed this

Eighteenth Day of August, 2009

David J. Kappos
*Director of the United States Patent and Trademark Office*